United States Patent
Leinweber et al.

(10) Patent No.: US 8,920,543 B2
(45) Date of Patent: Dec. 30, 2014

(54) ADDITIVES FOR INHIBITION OF GAS HYDRATE FORMATION

(75) Inventors: Dirk Leinweber, Kelkheim (DE); Alexander Roesch, Oppenheim (DE); Carsten Schaefer, Muehldorf (DE); Alexander Woerndle, Frankfurt am Main (DE)

(73) Assignee: Clariant Finance (BVI) Limited, Tortola (VG)

( * ) Notice: Subject to any disclaimer, the term of this patent is extended or adjusted under 35 U.S.C. 154(b) by 0 days.

(21) Appl. No.: 13/698,898

(22) PCT Filed: Apr. 27, 2011

(86) PCT No.: PCT/EP2011/002099
§ 371 (c)(1), (2), (4) Date: Nov. 19, 2012

(87) PCT Pub. No.: WO2011/150997
PCT Pub. Date: Dec. 8, 2011

(65) Prior Publication Data
US 2013/0065799 A1 Mar. 14, 2013

(30) Foreign Application Priority Data
Jun. 4, 2010 (DE) .......... 10 2010 022 759

(51) Int. Cl.
| B01D 47/00 | (2006.01) |
| C09K 8/52 | (2006.01) |
| C08F 220/26 | (2006.01) |
| C08F 226/06 | (2006.01) |
| C08F 226/10 | (2006.01) |

(52) U.S. Cl.
CPC ........... C08F 220/26 (2013.01); C09K 2208/22 (2013.01); C09K 8/52 (2013.01); C08F 226/06 (2013.01); C08F 226/10 (2013.01)
USPC ............. 95/153; 516/161; 516/181; 516/182; 516/185; 516/189; 516/191; 525/187; 525/404; 525/408

(58) Field of Classification Search
USPC ............ 95/153; 516/161, 181, 182, 185, 189, 516/191; 525/187, 404, 408
See application file for complete search history.

(56) References Cited

U.S. PATENT DOCUMENTS

| 6,034,208 A | 3/2000 | McDaniel et al. |
| 6,093,862 A * | 7/2000 | Sinquin et al. ............ 585/15 |
| 6,545,083 B1 | 4/2003 | Hirata et al. |
| 6,867,262 B1 | 3/2005 | Angel et al. |

| 2004/0030206 A1 * | 2/2004 | Dahlmann et al. ............. 585/15 |
| 2011/0160404 A1 | 6/2011 | Fechner et al. |
| 2012/0080643 A1 | 4/2012 | Leinweber et al. |

FOREIGN PATENT DOCUMENTS

| DE | 60029666 | 8/2007 |
| DE | 102006049804 | 4/2008 |
| EP | 0792850 | 9/1997 |
| EP | 0668958 | 3/1998 |
| EP | 0896123 | 2/1999 |
| EP | 1339947 | 7/2005 |
| EP | 1206510 | 8/2005 |
| EP | 1630211 | 3/2006 |
| WO | WO93/25798 | 12/1993 |
| WO | WO02/44519 | 6/2002 |
| WO | WO2008/049471 | 5/2008 |
| WO | WO2010/020314 | 2/2010 |
| WO | WO2010/149253 | 12/2010 |

OTHER PUBLICATIONS

International Search Report for PCT/EP2011/002099, mailed Sep. 6, 2011.
International Preliminary Report on Patentability for PCT/EP2011/002099, mailed Dec. 13, 2012.

* cited by examiner

Primary Examiner — Robert Jones, Jr.
(74) Attorney, Agent, or Firm — Tod A. Waldrop

(57) ABSTRACT

The invention provides for the use of copolymers comprising 1 to 99 mol % of structural units of the formula (1)

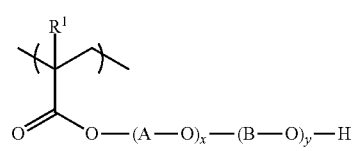

(1)

in which $R^1$ is hydrogen or $C_1$-$C_6$-alkyl, A is $C_2$-$C_4$-alkylene groups and B is $C_2$-$C_4$-alkylene groups, with the proviso that A is different than B, and x, y are each independently an integer of 1-100, and 1 to 99 mol % of structural units of the formula (3)

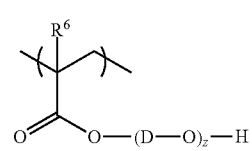

(3)

in which $R^6$ is hydrogen or $C_1$-$C_6$-alkyl, D is $C_2$-$C_4$-alkylene groups and z is an integer of 1-50, in amounts of 0.01 to 2% by weight, based on the water phase, as gas hydrate inhibitors.

16 Claims, No Drawings

ADDITIVES FOR INHIBITION OF GAS HYDRATE FORMATION

The present invention relates to the use of an additive and to a process for inhibiting nucleation, growth and/or agglomeration of gas hydrates, by adding an effective amount of an inhibitor to a polyphasic mixture which consists of water and gas, with or without condensate, and has a tendency to form hydrates, or to a drilling fluid having a tendency to form gas hydrates, said inhibitor comprising polymers of alkoxylated (meth)acrylic acid derivatives.

Gas hydrates are crystalline inclusion compounds of gas molecules in water which form under certain temperature and pressure conditions (low temperature and high pressure). The water molecules form cage structures around the appropriate gas molecules. The lattice structure formed from the water molecules is thermodynamically unstable and is only stabilized by the incorporation of guest molecules. Depending on pressure and gas composition, these icelike compounds can exist even beyond the freezing point of water (up to above 25° C.).

In the mineral oil and natural gas industry, great significance attaches in particular to the gas hydrates which form from water and the natural gas constituents methane, ethane, propane, isobutane, n-butane, nitrogen, carbon dioxide and hydrogen sulfide. Especially in modern natural gas extraction, the existence of these gas hydrates constitutes a great problem, especially when wet gas or polyphasic mixtures of water, gas and alkane mixtures are subjected to low temperatures under high pressure. As a consequence of their insolubility and crystalline structure, the formation of gas hydrates leads here to the blockage of a wide variety of extraction equipment such as pipelines, valves or production equipment in which wet gas or polyphasic mixtures are transported over relatively long distances at relatively low temperatures, as occurs especially in colder regions of the earth or on the seabed. Moreover, gas hydrate formation can also lead to problems in the course of the drilling operation to develop new gas or crude oil deposits at the appropriate pressure and temperature conditions by the formation of gas hydrates in the drilling fluids.

In order to prevent such problems, gas hydrate formation in gas pipelines, in the course of transport of polyphasic mixtures or in drilling fluids, can be suppressed by using relatively large amounts (more than 10% by weight, based on the weight of the aqueous phase) of lower alcohols such as methanol, glycol or diethylene glycol. The addition of these additives has the effect that the thermodynamic limit of gas hydrate formation is shifted to lower temperatures and higher pressures (thermodynamic inhibition). However, the addition of these thermodynamic inhibitors causes serious safety problems (flashpoint and toxicity of the alcohols), logistical problems (large storage tanks, recycling of these solvents) and accordingly high costs, especially in offshore extraction.

Attempts are therefore now being made to replace thermodynamic inhibitors by adding additives in amounts of <2% in temperature and pressure ranges in which gas hydrates can form. These additives either delay gas hydrate formation (kinetic inhibitors) or keep the gas hydrate agglomerates small and therefore pumpable, so that they can be transported through the pipeline (agglomerate inhibitors or antiagglomerants). The inhibitors used either prevent nucleation and/or the growth of the gas hydrate particles, or modify the hydrate growth in such a way that relatively small hydrate particles result.

The gas hydrate inhibitors which have been described in the patent literature, in addition to the known thermodynamic inhibitors, are a multitude of monomeric and also polymeric substance classes which are kinetic inhibitors or antiagglomerants. Of particular significance in this context are polymers having a carbon backbone which contain both cyclic (pyrrolidone or caprolactam radicals) and acyclic amide structures in the side groups.

For instance, EP-A-0 668 958 describes a process for kinetically inhibiting gas hydrate formation by the use of polyvinyllactams having a polymer weight of $M_W$>40 000 D, and WO-93025798 describes such a process using polymers and/or copolymers of vinylpyrrolidone having a polymer weight of $M_W$>5000 to 40 000 D.

EP-A-0 896 123 discloses gas hydrate inhibitors which may comprise copolymers of alkoxylated methacrylic acid [macromers] and cyclic N-vinyl compounds. The macromers used are pure polyethylene glycol monoesters or polypropylene glycol monoesters of (meth)acrylic acid.

EP-A-1 206 510 describes the use of polyalkylene glycol-grafted copolymers of vinyl acetate and vinyllactams. The polyalkylene glycol side chain is introduced into the polymer by free-radical grafting.

EP-A-1 339 947 describes the use of polymers based on end-capped poly-alkoxylate esters as gas hydrate inhibitors. The inventive monomers used thus do not have any terminal free hydroxyl groups.

The additives described are only of limited efficacy as kinetic gas hydrate inhibitors and/or antiagglomerants, or are not available in sufficient volume or only at excessively high cost.

In order to be able to use gas hydrate inhibitors even in the event of greater subcooling than currently possible, i.e. further within the hydrate region, or lower dosage, a further enhancement of action is required compared to the prior art hydrate inhibitors.

It was thus an object of the present invention to find improved additives which both slow the formation of gas hydrates (kinetic inhibitors) and keep gas hydrate agglomerates small and pumpable (antiagglomerants), in order thus to ensure a broad spectrum of application with high potential action. In addition, the additives were to be preparable in a controlled manner, in order to be able to tailor the water or oil solubility thereof with regard to use as a kinetic gas hydrate inhibitor or antiagglomerant. In addition, it was to be possible to replace the thermodynamic inhibitors currently being used (methanol and glycols), which cause considerable safety problems and logistics problems.

As has now been found, surprisingly, copolymers based on mixedly alkoxylated (meth)acrylic acid derivatives and homogeneously alkoxylated (meth)acrylic acid derivatives are suitable as gas hydrate inhibitors. According to the structure, the products can both retard the nucleation and growth of gas hydrates (kinetic gas hydrate inhibitors) and suppress the agglomeration of gas hydrates (antiagglomerants).

The invention therefore provides for the use of copolymers containing 1 to 99 mol % of structural units of the formula (1)

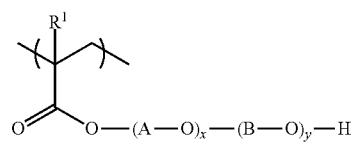

in which $R^1$ is hydrogen or $C_1$-$C_6$-alkyl,

A represents $C_2$-$C_4$-alkylene groups and

B represents $C_2$-$C_4$-alkylene groups, with the proviso that A is different than B, and x, y are each independently an integer of 1-100, and 1 to 99 mol % of structural units of the formula (3)

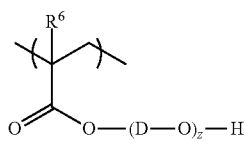
(3)

in which $R^6$ is hydrogen or $C_1$-$C_6$-alkyl,

D represents $C_2$-$C_4$-alkylene groups and z is an integer of 1-50, in amounts of 0.01 to 2% by weight, based on the water phase, as gas hydrate inhibitors.

The invention further provides a process for inhibiting nucleation, growth and/or agglomeration of gas hydrates, by adding an effective amount, preferably 0.01 to 2% by weight, based on the water phase, of an inhibitor to a polyphasic mixture which consists of water and gas, with or without condensate, and has a tendency to form hydrates, or to a drilling fluid having a tendency to form gas hydrates, said inhibitor comprising copolymers which contain 1 to 99 mol % of structural units of the formula (1)

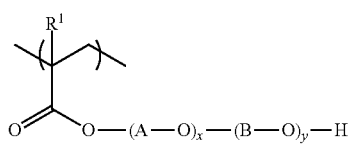
(1)

in which $R^1$ is hydrogen or $C_1$-$C_6$-alkyl,

A represents $C_2$-$C_4$-alkylene groups and

B represents $C_2$-$C_4$-alkylene groups, with the proviso that A is different than B, and x, y are each independently an integer of 1-100, and 1 to 99 mol % of structural units of the formula (3)

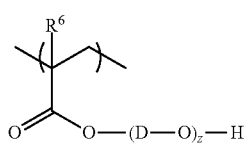
(3)

in which $R^6$ is hydrogen or $C_1$-$C_6$-alkyl,

D represents $C_2$-$C_4$-alkylene groups and z is an integer of 1-50.

The invention further provides copolymers containing 1 to 99 mol % of structural units of the formula (1)

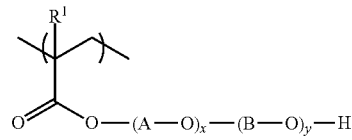
(1)

in which $R^1$ is hydrogen or $C_1$-$C_6$-alkyl,

A represents $C_2$-$C_4$-alkylene groups and

B represents $C_2$-$C_4$-alkylene groups, with the proviso that A is different than B, and x, y are each independently an integer of 1-100, and 1 to 99 mol % of structural units of the formula (3)

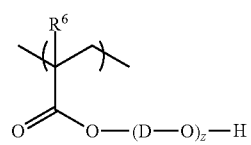
(3)

in which $R^6$ is hydrogen or $C_1$-$C_6$-alkyl,

D represents $C_2$-$C_4$-alkylene groups and z is an integer of 1-50.

The embodiments of the invention described hereinafter relate equally to the use and to the process.

In a preferred embodiment of the invention, $R^1$ is hydrogen or methyl.

A and B are each $C_2$-$C_4$-alkylene groups, with the proviso that A is unlike B. This means that the structural units of the formula (1) may be alkoxylated with up to 200 $C_2$-$C_4$-alkoxy units, which may be a blockwise alkoxylation with at least two of ethylene oxide, propylene oxide and butylene oxide, or a (random) mixed alkoxylation with at least two of ethylene oxide, propylene oxide and butylene oxide.

Preferably, A and B are an ethylene or propylene group. More preferably, A is a propylene group and B is an ethylene group. Specifically, A is a propylene group and B is an ethylene group where x=1 to 5 and y=3 to 40.

In the case of a random mixed alkoxylation with EO and PO, the ratio of ethylene to propylene groups is preferably 5:95 to 95:5, more preferably 20:80 to 80:20 and especially 40:60 to 60:40.

In a preferred embodiment of the invention, $R^6$ is hydrogen or methyl.

The monomer of the formula (3) is homogeneously alkoxylated. D is preferably an ethylene or propylene group. More preferably, D is a propylene group, in which case z=1-50, particularly z=3-30, especially z=5-10.

The copolymers for use in accordance with the invention contain preferably 5 to 95, particularly 20 to 80 and especially 40 to 60 mol % of structural units of the formula (1).

The copolymers for use in accordance with the invention contain preferably 5 to 95, particularly 10 to 80 and especially 15 to 75 mol % of structural units of the formula (3).

In a preferred embodiment, the structural units of the formulae (1) and (3) add up to 100 mol %.

The copolymers based on structural units of the formulae (1) and (3) are obtainable by the copolymerization of alkoxylated acrylic or methacrylic acid derivatives (the term "acrylic acid" hereinafter also refers to methacrylic acid). These are obtainable by alkoxylation of acrylic acid or 2-alkylacrylic acid or acrylic monoesters of ethylene glycol, of propylene glycol or of butylene glycol (2-hydroxyethyl acrylate, 2-hydroxypropyl acrylate or 2-hydroxybutyl acrylate) or 2-alkylacrylic monoesters of ethylene glycol, of propylene glycol or of butylene glycol (2-hydroxyethyl 2-alkylacrylate, 2-hydroxypropyl 2-alkylacrylate or 2-hydroxybutyl 2-alkylacrylate).

Particular preference is given to preparing the alkoxylated acrylic acid derivatives by DMC-catalyzed alkoxylation of 2-hydroxypropyl acrylate or 2-hydroxypropyl 2-alkylacrylate, especially by DMC-catalyzed alkoxylation of 2-hydroxypropyl 2-methacrylate. In contrast to traditional alkali-catalyzed alkoxylation, DMC catalysis allows a very selective synthesis of monomers with exactly defined properties, avoiding unwanted by-products. DE-A-102006049804 and U.S. Pat. No. 6,034,208 teach the advantages of DMC catalysis.

Depending on the structures of the structural units of the formulae (1) and (3), it is possible to modify the properties of the copolymers such that they can selectively inhibit, according to the given conditions, gas hydrate formation as specific additives.

A high ethylene oxide content results in water-soluble products which suppress the nucleation of the gas hydrates and act as kinetic inhibitors, or can enhance the effect of other kinetic inhibitors as synergistic components.

A high degree of propoxylation or butoxylation results in more hydrophobic/more lipophilic polymers of limited oil solubility with surfactant character, which wet the surface of gas hydrate particles with oil and hence prevent the agglomeration of the hydrates. They thus function as antiagglomerants, which are generally at least partly soluble in the condensate phase of the polyphasic mixture.

In addition to the structural units of the formulae (1) and (3), the inventive polymers, if they do not consist to an extent of 100 mol % of the structural units of the formulae (1) and (3), may comprise further structural units other than the structural units of the formulae (1) and (3). These further structural units are those which are derived from olefinically unsaturated monomers and which contain O, N, S or P. The polymers preferably contain oxygen-, sulfur- or nitrogen-containing comonomers, especially oxygen- or nitrogen-containing.

Suitable further structural units are preferably those derived from styrenesulfonic acid, acrylamidomethylpropanesulfonic acid (AMPS), vinylsulfonic acid, vinyl-phosphonic acid, allylsulfonic acid, methallylsulfonic acid, acrylic acid, methacrylic acid and maleic acid (and the anhydride thereof), and the salts of the afore-mentioned acids with mono- and divalent counterions. The counterions employed are preferably lithium, sodium, potassium, magnesium, calcium, ammonium, monoalkylammonium, dialkylammonium, trialkylammonium or tetraalkyl-ammonium, in which the alkyl substituents of the amines each independently are $C_1$ to $C_{22}$-alkyl radicals which may be occupied by 0 to 3 hydroxyalkyl groups, the alkyl chain length of which may vary within a range from $C_2$ to $C_{10}$. In addition, it is also possible to employ singly to triply ethoxylated ammonium compounds with different degrees of ethoxylation. Particular preference is given to sodium and ammonium as counterions. The degree of neutralization of the mole fraction of the above-described acids may also differ from 100 mol %. Suitable degrees of neutralization are all of those between 0 and 100 mol %, particular preference being given to the range between 70 and 100 mol %. Further suitable monomers are esters of acrylic acid and of methacrylic acid with aliphatic, aromatic or cycloaliphatic alcohols with a carbon number of $C_1$ to $C_{22}$. Further suitable monomers are 2- and 4-vinylpyridine, vinyl acetate, glycidyl methacrylate, acrylonitrile, vinyl chloride, vinylidene chloride, tetrafluoroethylene and dialkyldimethylammonium chloride (DADMAC).

The proportion of such further structural units is, for example, 1 to 98, preferably 10 to 80, particularly 20 to 60 and especially 40 to 60 mol %.

In a preferred embodiment, the structural units of the formulae (1) and (3) and the further structural units add up to 100 mol %.

In a further preferred embodiment of the invention, copolymers are used which contain
A) 1 to 98 mol % of structural units of the formula (1),
B) 1 to 98 mol % of structural units of the formula (2)

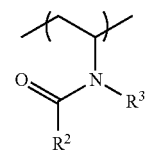

(2)

in which $R^2$ and $R^3$ are each independently hydrogen or $C_1$-$C_6$-alkyl, or form a ring of 5, 6 or 7 ring atoms including the nitrogen atom and the carbonyl group, and
C) 1 to 98 mol % of structural units of the formula (3).

Examples of compounds which lead to the structural units of the formula (2) include N-vinylformamide (NVF), N-vinylmethylformamide, N-vinyl-methylacetamide (VIMA), N-vinylacetamide, N-vinylpyrrolidone (NVP), 5-methyl-N-vinylpyrrolidone, N-vinylvalerolactam, and N-vinylcaprolactam. In a preferred embodiment of the invention, the structural units of the formula (2) derive from N-vinylacetamide, N-methyl-N-vinylacetamide, vinylpyrrolidone and vinyl-caprolactam.

The preferred amounts of structural units of the formula (2) are 2 to 97, preferably 5 to 95, particularly 10 to 80 and especially 15 to 60 mol %.

In one embodiment, the structural units of the formulae (1) and (3) and the structural units of the formula (2) add up to 100 mol %.

In a further preferred embodiment of the invention, copolymers are used which derive from
A) 1 to 97 mol % of structural units of the formula (1),
B) 1 to 97 mol % of structural units of the formula (2),
C) 1 to 97 mol % of structural units of the formula (3), and
D) 1 to 97 mol % of structural units derived from one or more further monomers from the group consisting of styrenesulfonic acid, acrylamidomethylpropanesulfonic acid (AMPS), vinylsulfonic acid, vinylphosphonic acid, allylsulfonic acid, methallylsulfonic acid, acrylic acid, methacrylic acid and maleic acid or the anhydride thereof, and the salts of the aforementioned acids with mono- and divalent counterions originate, and also 2-vinylpyridine, 4-vinylpyridine, vinyl acetate, glycidyl methacrylate, acrylonitrile, vinyl chloride, vinylidene chloride, tetrafluoroethylene and DADMAC.

In one embodiment, the copolymers contain 20 to 59 mol % of structural units of the formula (1), 20 to 59 mol % of structural units of the formula (2), 20 to 59 mol % of structural units of the formula (3) and 1 to 40 mol % of the structural units mentioned derived from the further monomers D).

In one embodiment, the structural units of the formulae (1), (2), (3) and of the further monomers D) mentioned add up to 100 mol %.

In a further preferred embodiment of the invention, copolymers are used which derive from
A) 1 to 97 mol % of structural units of the formula (1),
B) 1 to 97 mol % of structural units of the formula (2),
C) 1 to 97 mol % of structural units of the formula (3), and
D) 1 to 97 mol % of structural units of the formula (4)

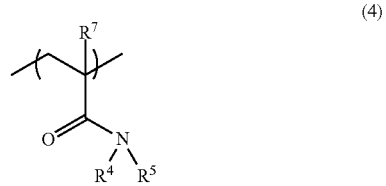

(4)

in which $R^4$ and $R^5$ are each independently hydrogen, $C_1$-$C_6$-alkyl or $C_1$-$C_6$-cycloalkyl or form a ring with 5, 6 or 7 ring atoms including the nitrogen atom, and $R^7$ is hydrogen or $C_1$-$C_6$-alkyl, and in which the structural units A), B), C) and D) add up to 100 mol %.

The amounts of structural units of the formula (4) are between 2 and 96, preferably 5 and 95, particularly 20 and 80 and especially 40 and 60 mol %.

In one embodiment, the structural units of the formulae (1), (2), (3) and (4) add up to 100 mol %.

$R^2/R^3$ and $R^4/R^5$ preferably each together contain at least 1 carbon atom, especially at least 2 carbon atoms.

The structural units of the formula (4) derive preferably from (meth)acrylic acid, (meth)acrylamide, N-alkyl(meth)acrylamides, N,N-dialkyl(meth)acrylamides, 2-dimethylamino methacrylate, N-acryloylpyrrolidine, N-acryloylmorpholine and N-acryloylpiperidine.

Polymers for use in accordance with the invention are prepared by free-radical polymerization of the monomers from which the structural units derive using a suitable free-radical initiator at temperatures between 50 and 150° C. The molecular weight of these polymers may vary within the range from 1000 to $10^6$ g/mol, but preference is given to molecular weights between 1000 and 40 000 g/mol.

Suitable alcoholic solvents are water-soluble mono- or dialcohols, for example propanols, butanols, ethylene glycol, and ethoxylated monoalcohols such as butylglycol, isobutylglycol and butyldiglycol. After the polymerization, generally clear solutions form.

The polymers can be used alone or in combination with other known gas hydrate inhibitors. In general, a sufficient amount of the inventive gas hydrate inhibitor will be added to the system having a tendency to form hydrates that sufficient inhibition is obtained under the given pressure and temperature conditions. The inventive gas hydrate inhibitors are generally used in amounts between 0.01 and 2% by weight (based on the weight of the aqueous phase), corresponding to 100-20 000 ppm, preferably 0.02 to 1% by weight. When the inventive gas hydrate inhibitors are used in a mixture with other gas hydrate inhibitors, the concentration of the mixture is 0.01 to 2% or 0.02 to 1% by weight in the aqueous phase.

EXAMPLES

General Synthesis Method for Preparation of the Polymers

A flask with stirrer, reflux condenser, internal thermometer and nitrogen inlet is initially charged with the monomers (amounts given in mol %) and the molecular weight regulator (dodecanethiol, 2.4 mol %) in solvent while introducing nitrogen. Then the temperature is brought to 80° C. while stirring and a solution of the initiator (AMBN, 5 mol %) is metered in within one hour. The mixture is stirred at this temperature for a further 3 hours and then cooled to room temperature. The polymers thus obtained contained monomers A, B, C and D in the same weight ratios as those in which the monomers were initially charged.

| | | Example No. Figures in mol % | | | | | | | | | |
|---|---|---|---|---|---|---|---|---|---|---|---|
| | | 1 | 2 | 3 | 4 | 5 | 6 | 7 (C) | 8 (C) | 9 (C) | 10 (C) |
| Monomer | Polyglycol 1 | 25.7 | 27.2 | 49.7 | 0.0 | 61.1 | 64.6 | 66.0 | 0.0 | 0.0 | 65.0 |
| | Polyglycol 2 | 31.1 | 31.3 | 0.0 | 34.6 | 0.0 | 0.0 | 0.0 | 69.1 | 0.0 | 14.5 |
| | Polyglycol 4 | 26.0 | 22.8 | 0.0 | 16.8 | 0.0 | 0.0 | 0.0 | 0.0 | 53.2 | 0.0 |
| | Polyglycol 5 | 0.0 | 0.0 | 26.4 | 0.0 | 15.3 | 15.1 | 0.0 | 0.0 | 18.8 | 0.0 |
| | N-Vinylcaprolactam | 17.3 | 8.4 | 24.0 | 33.4 | 0.0 | 0.0 | 34.0 | 30.9 | 0.0 | 0.0 |
| | N-Vinylpyrrolidone | 0.0 | 10.3 | 0.0 | 15.2 | 19.3 | 20.4 | 0.0 | 0.0 | 28.0 | 20.5 |
| | 2-Acrylamido-2-methyl-propanesulfonic acid sodium salt | 0.0 | 0.0 | 0.0 | 0.0 | 4.4 | 0.0 | 0.0 | 0.0 | 0.0 | 0.0 |
| Solvent | Isopropanol | 314 | — | — | — | — | 314 | 314 | 314 | — | — |
| | Monoethylene glycol | — | 314 | 314 | 314 | 314 | — | — | — | 314 | 314 |

| | | Example No. Figures in mol % | | | | | | | | | |
|---|---|---|---|---|---|---|---|---|---|---|---|
| | | 11 | 12 | 13 | 14 (C) | 15 | 16 (C) | 17 (C) | 18 | 19 | 20 | 21 |
| Monomer | Polyglycol 1 | 0.0 | 29.2 | 28.8 | 0.0 | 0.0 | 0.0 | 0.0 | 50.6 | 0.0 | 0.0 | 28.0 |
| | Polyglycol 2 | 67.0 | 40.4 | 39.9 | 82.6 | 25.6 | 0.0 | 0.0 | 0.0 | 30.7 | 25.3 | 34.6 |
| | Polyglycol 3 | 16.2 | 13.3 | 13.1 | 0.0 | 3.0 | 74.3 | 0.0 | 0.0 | 0.0 | 0.0 | 0.0 |
| | Polyglycol 6 | 9.8 | 0.0 | 0.0 | 0.0 | 12.1 | 0.0 | 0.0 | 25.0 | 0.0 | 48.9 | 0.0 |
| | Polyglycol 7 | 0.0 | 0.0 | 0.0 | 0.0 | 0.0 | 0.0 | 55.0 | 0.0 | 11.3 | 0.0 | 20.6 |
| | N-Vinylcaprolactam | 15.2 | 16.0 | 15.8 | 15.3 | 59.3 | 19.7 | 45.0 | 24.4 | 58.1 | 25.8 | 16.8 |
| | N-Vinylpyrrolidone | 0.0 | 0.0 | 1.4 | 2.1 | 0.0 | 3.4 | 0.0 | 0.0 | 0.0 | 0.0 | 0.0 |
| | 2-Acrylamido-2-methyl-propanesulfonic acid sodium salt | 1.6 | 1.1 | 1.1 | 0.0 | 0.0 | 2.6 | 0.0 | 0.0 | 0.0 | 0.0 | 0.0 |
| Solvent | Isopropanol | 314 | — | — | — | — | 314 | 314 | 314 | — | — | — |
| | Monoethylene glycol | — | 314 | 314 | 314 | 314 | — | — | — | 314 | 314 | 314 |

Composition of Individual Monomers:

Polyglycol 1 Polyalkylene glycol monomethacrylate ester of the formula (1), x=2, y=3-4; (A-O) is [$CH_2CH(CH_3)O$], (B—O) is ($CH_2CH_2O$), molar mass approx. 350 g/mol, prepared by means of DMC-catalyzed alkoxylation.

Polyglycol 2 Polyalkylene glycol monomethacrylate ester of the formula (1), x=4-5, y=9-10; (A-O) is [$CH_2CH(CH_3)O$], (B—O) is ($CH_2CHO$), molar mass approx. 750 g/mol, prepared by means of DMC-catalyzed alkoxylation.

Polyglycol 3 Polyethylene glycol monomethacrylate ester of the formula (3), z=3-4; (D-O) is [$CH_2CH_2O$], molar mass approx. 250 g/mol.

Polyglycol 4 Polypropylene glycol monomethacrylate ester of the formula (3), z=4-5; (D-O) is [$CH_2CH(CH_3)O$], molar mass approx. 350 g/mol.

Polyglycol 5 Polypropylene glycol monomethacrylate ester of the formula (3), z=10-11; (D-O) is [$CH_2CH(CH_3)O$], molar mass approx. 700 g/mol.

Polyglycol 6 Polypropylene glycol monomethacrylate ester of the formula (3), z=25-26; (D-O) is [$CH_2CH(CH_3)O$], molar mass approx. 1550 g/mol.

Polyglycol 7 Polypropylene glycol monomethacrylate ester of the formula (3), z=50-51; (D-O) is [$CH_2CH(CH_3)O$], molar mass approx. 3000 g/mol AMBN=2,2'-Azobis(2-methylbutyronitrile)

Test Results

To study the inhibiting action of the polymers, a stirred steel autoclave with temperature control, pressure and torque sensor of capacity 450 ml was used. For studies of kinetic inhibition, the autoclave was filled with distilled water and gas in a volume ratio of 40:60; for studies of agglomerate inhibition, a condensate phase was additionally added. The starting natural gas pressure was 40 bar for evaluation of the kinetic inhibitors, and 65 bar for evaluation of the antiagglomerants.

Composition of the Natural Gas Used:

Methane 77.1%, ethane 13.6%, propane 3.7%, butane 1.0%, pentane 0.3% carbon dioxide 2.6%, nitrogen 1.7%.

Proceeding from a starting temperature of 20° C., the autoclave was cooled to 4° C. within 3 h. At first, a pressure decrease in accordance with the thermal compression of the gas to approx. 36 bar (kinetic inhibitors) or 60 bar (antiagglomerants) was observed, which corresponds to subcooling of 9° C. and 14.5° C. respectively. If the formation of gas hydrate nuclei occurs during the subcooling time, the pressure measured decreases, and a rise in the torque measured and a slight rise in the temperature are observed. Further growth and increasing agglomeration of the hydrate nuclei lead, without inhibitor, rapidly to a further rise in the torque.

A measure used for the inhibiting action of the polymer is the time from the attainment of the minimum temperature of 4° C. until the first gas absorption ($T_{ind}$). Long induction times indicate action as a kinetic inhibitor. The torque measured in the autoclave serves, in contrast, as a parameter for the agglomeration of the hydrate crystals. In the case of an antiagglomerant with good activity, the torque which builds up after gas hydrates have formed is distinctly reduced compared to the blank value. In the ideal case, snowlike fine hydrate crystals form in the condensate phase, which do not agglomerate and hence do not lead to the blockage of the installations serving for gas transport and for gas production.

The comparative substances used from the prior art were the following products:

1. Copolymer C from example 1 of EP0896123=comparative 1

2. Example 6 of EP1339947=comparative 2

TABLE 1

| Kinetic inhibition | | |
|---|---|---|
| Polymer example | Dosage ppm | $T_{ind}$ (h) |
| Blank value | — | 0 |
| 1 | 3000 | 16.2 |
| 2 | 3000 | 14.8 |
| 3 | 3000 | 15.2 |
| 4 | 3000 | 17.6 |
| 5 | 3000 | 13.6 |
| 6 | 3000 | 13.8 |
| 7 (C) | 3000 | 10.0 |
| 8 (C) | 3000 | 8.5 |
| 9 (C) | 3000 | 0.7 |
| 10 (C) | 3000 | 10.3 |
| 11 | 3000 | 12.5 |
| 12 | 3000 | 13.1 |
| 13 | 3000 | 13.3 |
| 14 (C) | 3000 | 7.4 |
| 15 | 3000 | 15.1 |
| 16 (C) | 3000 | 1.0 |
| Comparative 1 | 3000 | 0.5 |
| Comparative 2 | 3000 | 1.5 |
| Comparative 1 | 5000 | 2.0 |
| Comparative 2 | 5000 | 6.3 |

As is evident from the above test results, the inventive products act as kinetic gas hydrate inhibitors and show a distinct improvement over the prior art.

TABLE 2

| Action as antiagglomerants | | | |
|---|---|---|---|
| Polymer example | Dosage ppm | $T_{ind}$ (h) | $M_{max}$(Ncm) |
| Blank value | — | 0.1 | 15.6 |
| 17 (C) | 3000 | 1.7 | 5.5 |
| 18 | 3000 | 7.5 | 2.1 |
| 19 | 3000 | 8.1 | 1.8 |
| 20 | 3000 | 6.8 | 2.5 |
| 21 | 3000 | 6.1 | 2.6 |
| Comparative 1 | 3000 | 0.2 | 10.5 |
| Comparative 2 | 3000 | 0.3 | 6.7 |
| Comparative 1 | 5000 | 0.3 | 10.3 |
| Comparative 2 | 5000 | 2.5 | 5.9 |

As can be seen from these examples, the torques measured were greatly reduced compared to the blank value in spite of hydrate formation. This suggests distinct agglomerate-inhibiting action of the inventive products. Surprisingly, the products under the test conditions additionally also had distinct action as kinetic inhibitors.

The invention claimed is:

1. A gas hydrate inhibitor comprising copolymers containing

A) 1 to 99 mol % of structural units of the formula (1)

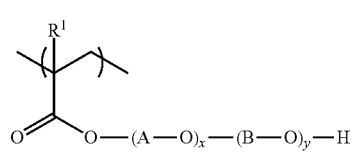

in which $R^1$ is hydrogen or $C_1$-$C_6$-alkyl,

A is a $C_2$-$C_4$-alkylene group and

B is a $C_2$-$C_4$-alkylene group, with the proviso that A is different than B, and x, y are each independently an integer of 1-100, and B) 1 to 99 mol % of structural units of the formula (3)

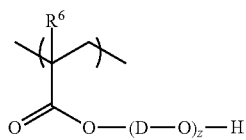

(3)

in which $R^6$ is hydrogen or $C_1$-$C_6$-alkyl,

D is a $C_2$-$C_4$-alkylene group and z is an integer of 1-50, in amounts of 0.01 to 2% by weight, based on the water phase.

2. The gas hydrate inhibitor as claimed in claim 1, in which the copolymers contain A) 1 to 98 mol % of structural units of the formula (1), B) 1 to 98 mol % of structural units of the formula (2)

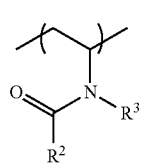

(2)

in which $R^2$ and $R^3$ are each independently hydrogen or $C_1$-$C_6$-alkyl, or form a ring of 5, 6 or 7 ring atoms including the nitrogen atom and the carbonyl group, and C) 1 to 98 mol % of structural units of the formula (3).

3. The gas hydrate inhibitor as claimed in claim 2, in which the structural units of the formula (2) are derived from N-vinylacetamide, N-methyl-N-vinylacetamide, N-vinylpyrrolidone and N-vinylcaprolactam.

4. The gas hydrate inhibitor as claimed in claim 2, in which the copolymers derive A) 1 to 97 mol % of structural units of the formula (1), B) 1 to 97 mol % of structural units of the formula (2), C) 1 to 97 mol % of structural units of the formula (3), and D) 1 to 97 mol % of structural units derived from one or more of the further monomers styrenesulfonic acid, acrylamidomethylpropanesulfonic acid (AMPS), vinylsulfonic acid, vinylphosphonic acid, allylsulfonic acid, methallylsulfonic acid, acrylic acid, methacrylic acid and maleic acid or the anhydride thereof, and the salts of the aforementioned acids with mono- and divalent counterions originate, and also 2-vinylpyridine, 4-vinylpyridine, vinyl acetate, glycidyl methacrylate, acrylonitrile, vinyl chloride, vinylidene chloride, tetrafluoroethylene and DADMAC.

5. The gas hydrate inhibitor as claimed in claim 2, in which the copolymers contain A) 1 to 97 mol % of structural units of the formula (1), B) 1 to 97 mol % of structural units of the formula (2), C) 1 to 97 mol % of structural units of the formula (3) and D) 1 to 97 mol % of structural units of the formula (4)

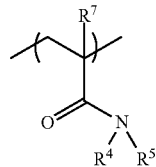

(4)

in which $R^4$ and $R^5$ are each independently hydrogen, $C_1$-$C_6$-alkyl or $C_1$-$C_6$-cycloalkyl, and $R^7$ is hydrogen or $C_1$-$C_6$-alkyl, or form a ring with 5, 6 or 7 ring atoms including the nitrogen atom.

6. The gas hydrate inhibitor as claimed in claim 4, in which the amounts of structural units A), B), optionally C) or optionally D) are 10 to 80 mol %.

7. The gas hydrate inhibitor as claimed in claim 2, in which $R^2/R^3$ together contain at least 2 carbon atoms.

8. The gas hydrate inhibitor as claimed in claim 5, in which $R^4/R^5$ together contain at least 2 carbon atoms.

9. The gas hydrate inhibitor as claimed in claim 5, in which the structural units of the formula (4) derive from (meth)acrylamide, N-alkyl(meth)acrylamides, N,N-dialkyl(meth)acrylamides, 2-dimethylamino methacrylate, N-acryloylpyrrolidine, N-acryloylmorpholine and N-acryloylpiperidine.

10. The gas hydrate inhibitor as claimed in claim 1, in which the molecular weight of the copolymers is in the range from 1000 to $10^6$ g/mol.

11. The gas hydrate inhibitor as claimed in claim 1, wherein the structural unit of the formula (1), the structural unit of the formula (3) or both is/are prepared by DMC catalysis.

12. The gas hydrate inhibitor as claimed in claim 1, in which the copolymers contain A) 1 to 98 mol % of structural units of the formula (1) and B) 1 to 98 mol % of structural units derived from one or more monomers from the group consisting of styrenesulfonic acid, acrylamidomethylpropanesulfonic acid (AMPS), vinylsulfonic acid, vinylphosphonic acid, allylsulfonic acid, methallylsulfonic acid, acrylic acid, methacrylic acid and maleic acid or the anhydride thereof, and the salts of the aforementioned acids with mono- and divalent counterions, and also 2-vinylpyridine, 4-vinylpyridine, vinyl acetate, glycidyl methacrylate, acrylonitrile, vinyl chloride, vinylidene chloride, tetrafluoroethylene and DADMAC, and C) 1 to 98 mol % of structural units of the formula (3).

13. The gas hydrate inhibitor as claimed in claim 1, in which the copolymers contain A) 1 to 97 mol % of structural units of the formula (1), B) 1 to 97 mol % of structural units of the formula (4)

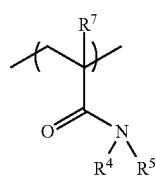

(4)

in which $R^4$ and $R^5$ are each independently hydrogen, $C_1$-$C_6$-alkyl or $C_1$-$C_6$-cycloalkyl, and $R^7$ is hydrogen or $C_1$-$C_6$-alkyl, or form a ring including the nitrogen atom and having 5, 6 or 7 ring atoms, C) 1 to 97 mol % of structural units of the formula (3).

14. The gas hydrate inhibitor as claimed in claim 1, in which the copolymer contains 15 to 80 mol % of structural units A) and 15 to 80 mol % of structural units B).

15. The gas hydrate inhibitor as claimed in claim 2, in which the copolymer contains 5 to 90 mol % of structural units A), 5 to 90 mol % of structural units B) and 5 to 90 mol % of structural units C).

16. A process for inhibiting nucleation, growth and/or agglomeration of gas hydrates, comprising the step of adding an effective amount of an inhibitor to a polyphasic mixture which comprises water and gas, with or without condensate, and has a tendency to form hydrates, or to a drilling fluid having a tendency to form gas hydrates, wherein the inhibitor comprises copolymers which contain A) 1 to 99 mol % of structural units of the formula (1),

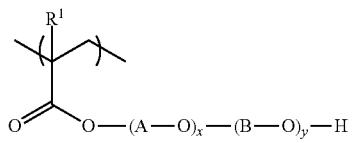
(1)

in which
$R^1$ is hydrogen or $C_1$-$C_6$-alkyl,
A is a $C_2$-$C_4$-alkylene group and
B is a $C_2$-$C_4$-alkylene group, with the proviso that A is different than B, and
x, y are each independently an integer of 1-100, and
B) 1 to 99 mol % of structural units of the formula (3)

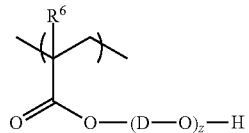
(3)

in which
$R^6$ is hydrogen or $C_1$-$C_6$-alkyl,
D is a $C_2$-$C_4$-alkylene group and
z is an integer of 1-5.

* * * * *